June 6, 1944.  A. C. RUGE  2,350,972
STRAIN GAUGE
Filed Sept. 16, 1939
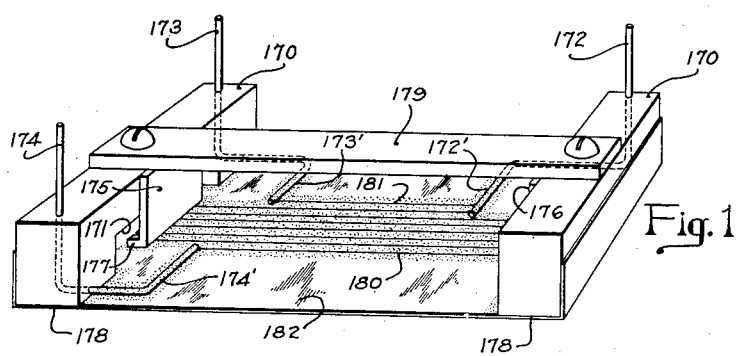
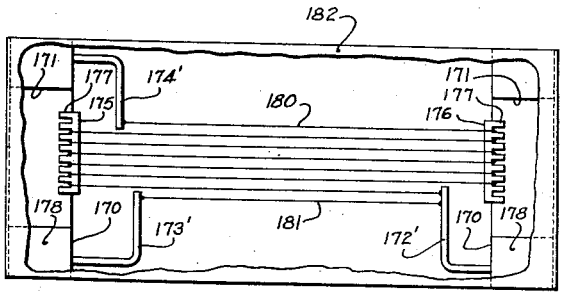
INVENTOR
ARTHUR C. RUGE
BY
ATTORNEY Patented June 6, 1944

2,350,972

UNITED STATES PATENT OFFICE 2,350,972

STRAIN GAUGE

Arthur C. Ruge, Cambridge, Mass.

Application September 16, 1939, Serial No. 295,207

19 Claims. (Cl. 201—63)

This invention relates generally to strain measuring means and more particularly to improved electrical strain-sensitive means and arrangements thereof for determining the strain (deformation) of a specimen or other member subjected to stress (load).

It is an object of my invention to provide an improved strain gauge that is relatively simple in construction and operation and is adapted to be readily affixed to a member whose strain is to be measured, the gauge being of the type employing a fine wire bonded throughout its length to a member subject to strain and whose electrical resistance varies in proportion to strain.

A further object is to provide a gauge of the foregoing type and embodying improved temperature compensating characteristics.

Other objects and advantages will be more apparent to those skilled in the art from the following description of the accompanying drawing in which:

Fig. 1 is an enlarged perspective of the rear side of a strain gauge embodying my invention and arranged to allow strain sensitive wires to be readily applied to a specimen; and Fig. 2 is a plan view of the front side of Fig. 1, parts being broken away to show details of construction.

In the embodiment of my invention, I employ a strain sensitive metallic filament preferably in the form of a wire but which may be a ribbon or other suitable form and the full effective length of this filament is bonded by suitable cement to a member subject to variations in strain, thereby to transmit the strain through the bonding cement to the filament. The electrical resistance of such a filament varies with its strain, herein called "strain-sensitive".

A wire filament of 1/1000 inch diameter is desirable because of beneficial results such as; high resistance in a compact device; the filament can be easily handled and seen; and it can carry sufficient current without overheating.

Practically all materials have strain-sensitivity such for example as gold, iron, platinum, silver, nickel, copper and various alloys known by such trade names as "Iso-elastic," "Advance," "Nichrome" and others. The composition of such alloys are well-known in the art. For example, Advance is a copper-nickel alloy having generally 45% nickel and 55% copper; Nichrome is a nickel chromium composition containing approximately 60% nickel, 15% chromium and 25% iron; while Iso-elastic has the same general composition as Nichrome. In addition to any of the foregoing metals, of which Advance is one of the more desirable, any other metals may be employed once their strain-sensitive factor is determined. I have also successfully used a variety of cementing agents such as shellac, sealing wax and cements having the trade names of Duco household cement and Bakelite cement.

To support the filament I provide a pair of end supports 170 having notches 171 formed in the front side thereof. These end supports are made of Bakelite or any non-conductor of electricity and serve as a strong attachment for lead wires 172, 173 and 174 which extend through the end supports and are then turned inwardly with horizontal right angled arms 172', 173' and 174'. Flexible pieces 175 and 176 of non-conducting material such as Bakelite or celluloid are cemented or otherwise suitably secured to the end supports 170 and are provided with slotted flanges 177 terminating within the recesses 171. The free ends of pieces 175 terminate in a plane containing front surface 178 of end supports 170. A spacing bar 179 is removably secured by screws to the end supports 170. With the structure as described, a strain filament 180 is secured to terminal arm 174' and then strung back and forth between the slots of flanges 177 and finally connected to terminal arm 172'. The filament need not be stretched taut however. Thus a filament or several inches in length is provided in an instrument whose overall length is about 1 inch. A temperature compensating filament 181 is connected between terminals 172' and 173'. A sheet of paper 182 is then cemented to the end members 170 and to the strain sensitive filaments 180 and 181 as well as to the terminal arms 172', 173' and 174'. The gauge now provides a self-contained unit which can be readily attached to a specimen by placing cement on the specimen surface and then pressing the front side of the paper 182 (undersurface, Fig. 1) against the specimen surface. The paper 182 provides a suitable insulation between the specimen and the filaments, and in addition the paper is highly desirable because of its easy availability, good cementing properties, convenience in handling, cutting and cheapness as well as many other desirable properties. When the cement has set, the operator merely removes one or both of the screws which secure bar 179 to the end supports 170 whereupon the usual external galvanometer circuit may be connected to the filament leads. Strain of the specimen will cause a corresponding strain of the filament in either tension or compression.

*Temperature compensated gauges using two or more kinds of filament material.*—In this arrangement I employ a combination of wires, ribbons, or filaments which may be considered as illustrated at 180 and 181 of different materials and different thermal coefficients of electrical resistance whereby the overall resistance of the unit is unaffected by temperature and by strains due to temperature thereby indicating only those strains which are due to stress at the surface to which the unit or gauge is applied. Thus a gauge may be made up of two filaments 180 and 181 whose materials respectively have positive and negative thermal coefficients of resistance, the filament wires being of such relative resistances that the overall temperature coefficient is fixable at any desired value between the two. The connections between the two wires may be either series or parallel simply by choice of the external connections 172, 173 and 174, depending upon convenience and choice of materials and sizes of wires.

A change in resistance of the filaments may be measured by a usual Wheatstone bridge.

From the disclosure herein it is seen that I have provided extremely effective and simple means for measuring strain with a high degree of accuracy and sensitivity, all in a manner that is relatively inexpensive and compact and that lends itself to expeditious handling and application to specimens or full size members.

It will of course be understood that various changes in details of construction and arrangement of parts may be made by those skilled in the art without departing from the spirit of the invention as set forth in the appended claims.

I claim:

1. A strain gauge comprising a pair of spaced supporting members, and a filament of continuous solid electrical conducting material whose electrical resistance varies in accordance with the strain therein, said filament being supported by and suspended between said supporting members wholly in a plane that lies on one side of said supporting members when the gauge is not in use whereby said filament is adapted when in use to lie in close uniform juxtaposition to the surface of a test member and to be bonded thereto throughout the effective length of said filament.

2. A strain gauge comprising a pair of spaced supporting members, a filament of continuous solid electrical conducting material whose electrical resistance varies in accordance with the strain therein, said filament being supported by and suspended between said supporting members wholly in a plane that lies on one side of said supporting members when the gauge is not in use whereby said filament is adapted when in use to lie in close uniform juxtaposition to the surface of a test member and to be bonded thereto throughout the effective length of said filament, and means for holding said supporting members in spaced relation to each other when the filament is not bonded to the test element and for releasing said holding means when the filament is bonded to the test element.

3. A strain gauge comprising a filament of continuous solid electrical conducting material whose electrical resistance varies in accordance with the strain therein, said filament being normally secured throughout its effective length to the surface of an element to be subjected to strain, a pair of spaced members for supporting said filament wholly in a plane that lies on one side of said support, and a flexible electrical insulating membrane secured to said supporting members so as to lie in said plane and extending under one side of said filament and secured thereto throughout the effective length of the filament whereby said membrane is normally interposed between the filament and test surface to insulate said filament from said element when the membrane is bonded thereto.

4. A strain gauge comprising a filament of continuous solid electrical conducting material whose electrical resistance varies in accordance with the strain therein, said filament being normally secured throughout its effective length to the surface of an element to be subjected to strain, a pair of spaced members for supporting said filament wholly in a plane that lies on one side of said support, a flexible electrical insulating membrane secured to said supporting members so as to lie in said plane and extending under one side of said filament and bonded thereto throughout the effective length of said filament whereby said membrane is normally interposed between the filament and test surface to insulate said filament from said element when the membrane is cemented thereto, and a spacer bar connected to said supporting members for releasably holding the same in spaced relation to each other when the specimen is not cemented to the test element.

5. A strain gauge comprising a filament of continuous solid electrical conducting material whose electrical resistance varies in accordance with the strain therein, said filament being normally secured throughout its effective length to the surface of an element to be subjected to strain, a pair of spaced members for supporting said filament wholly in a plane that lies on one side of said support, a flexible electrical insulating membrane secured to and suspended between said spaced members so as to lie in said plane, said filament being bonded throughout its effective length to said membrane on the normally upper side thereof whereby said membrane insulates said filament from said element when the normally under side of said membrane is cemented to said strained element, and relatively rigid leads secured in said supporting members and terminating at points on the same side of said membrane as said filament is on and said filament having its ends secured to said terminal leads.

6. A strain gauge comprising a filament of continuous solid electrical conducting material whose electrical resistance varies in accordance with the strain therein, said filament being normally secured throughout its entire effective length to a member to be subjected to strain, a pair of spaced members carrying supporting pieces with freely projecting ends terminating substantially in the plane of one side of said spaced members and said filament being supported by said freely projecting ends so as to lie in said plane, and means for maintaining said spaced members in fixed relation to each other when the gauge is not affixed to a member under test.

7. A strain gauge comprising a filament of continuous solid electrical conducting material whose electrical resistance varies in accordance with the strain therein, said filament being normally adapted when in use to be bonded throughout its effective length to the surface of a member to be subjected to strain, and a frame having spaced elements to which the filament is connected only at its ends so that the intermediate portion of the filament is wholly suspended between said elements and lies substantially in a plane defining one side of the gauge when not in use.

8. A strain gauge comprising a frame having spaced supporting elements, a membrane of insulating material secured to said elements so that the intermediate portion of said membrane is suspended between said elements so as to lie wholly in a plane on the outside of the gauge, and a filament of electrical conducting material whose resistance varies with changes of strain therein mounted on and secured throughout its effective length to said membrane.

9. A strain gauge comprising a frame, a relatively taut membrane supported at spaced points by said frame while the intermediate portion of said membrane is suspended between said points so as to lie in a plane defining one side of the gauge when not in use, a filament of continuous solid electrical conducting material whose electrical resistance varies in accordance with its strain and bonded throughout its effective length to said membrane to form a unit therewith, and said unit being adapted to be mounted on and secured throughout the effective length of said filament to a member subject to strain.

10. A strain gauge comprising a membrane, and a filament of continuous solid electrical conducting material whose electrical resistance varies in accordance with its strain mounted on and secured throughout its effective length to one side of said membrane which is adapted to have its other side cemented throughout said effective length to the surface of a member to be subjected to strain.

11. A strain gauge comprising a frame having rigid leads supported by the frame and terminating in spaced relation thereto and in fixed relation to each other, and a filament of continuous solid electrical conducting material whose electrical resistance varies in accordance with its strain extending between and secured to said leads so as to have a predetermined gauge length established and maintained by said leads, and said filament being adapted to be normally bonded throughout its effective length to the surface of a member to be subjected to strain.

12. A strain gauge comprising a frame having spaced supporting portions normally maintained in rigid relation to each other when not in use, a filament of continuous solid electrical conducting material whose electrical resistance varies in accordance with its strain supported by and suspended between said portions, said filament being adapted to be normally bonded throughout its effective length to the surface of a member to be subjected to strain, and means for relieving the rigid spacing of said portions so as to allow the filament to follow freely any strain of a test member to which the filament is bonded.

13. A strain gauge comprising a membrane, a filament of continuous solid electrical conducting material whose electrical resistance varies in accordance with the strain thereof, said filament being cemented throughout its entire effective length to one side of said membrane, and lead supporting means mounted on said membrane and having leads to which said filament is connected, thereby forming a self-contained unitary structure adapted to be bonded to a test member subject to strain so that said entire effective length of the filament is rigid with said test member.

14. A strain gauge for a body adapted to be variably strained comprising, in combination, a continuous solid filament of electrical conducting material whose electrical resistance varies in accordance with its strain, a support for said filament adapted to be adhesively bonded to said body and to said filament throughout the effective length of the filament whereby deformations of the body are transmitted through the support to the filament to cause the latter to follow the deformations of the body and correspondingly vary the electrical resistance of the filament, and a second filament formed as a self-contained part of said gauge to compensate for temperature effects, said filaments being of different materials and of different and opposite thermal coefficients of electrical resistance whereby the overall electrical resistance of the gauge is substantially unaffected by variations in resistance of said filaments arising from temperature changes thereby allowing said apparatus to be responsive substantially solely to strain in the body under test.

15. The combination set forth in claim 14 further characterized by the provision of means whereby said temperature compensating filament is adapted to be selectively connected either in series or parallel with said strain responsive filament.

16. The combination set forth in claim 14 further characterized by the provision of three leads between two of which said strain responsive filament is connected while the temperature compensating filament is connected between one of said latter leads and the third lead, whereby said temperature compensating filament may be selectively connected by said leads either in series or in parallel with said strain responsive filament.

17. A strain gauge for a body adapted to be variably strained comprising, in combination, a continuous solid filament of electrical conducting material whose electrical resistance varies in accordance with its strain, a flexible membrane for supporting said filament adapted to be adhesively bonded to said body and to said filament throughout its effective length whereby deformations of the body are transmitted through the support to the filament to cause the latter to follow the deformations of the body and correspondingly vary the electrical resistance of the filament, and a second filament bonded throughout its length to said membrane to form a self-contained part of said gauge so that said second filament is strained identically with the other filament in response to strain of the test body and the relative thermal coefficients of said filaments being such as to maintain the overall electrical resistance of the gauge substantially unaffected by variations in resistance of said filaments arising from temperature changes thereby allowing said gauge to be responsive substantially solely to strain in said body.

18. A strain gauge for a body adapted to be variably strained comprising, in combination, a continuous solid filament of electrical conducting material whose electrical resistance varies in accordance with its strain, a support for said filament adapted to be adhesively bonded to said body and to said filament throughout its effective length whereby deformations of the body are transmitted through the support to the filament to cause the latter to follow the deformations of the body and correspondingly vary the electrical resistance off the filament, and a second filament formed as a self-contained part of said gauge by being normally bonded throughout its effective length to said support so as to be subject to strain identically with the other filament, said filaments being of different materials and of different and opposite thermal coefficients of electrical resistance whereby the overall electrical resistance of the gauge is substantially unaffected by variations in resistance of said filaments arising from temperature changes thereby allowing said apparatus to be responsive substantially solely to strain in the body under test.

19. The combination set forth in claim 14 further characterized in that both of said filaments extend substantially in the same direction so that both of the same are subjected to strain of the body to which the gauge is attached.

ARTHUR C. RUGE.